United States Patent
James et al.

(10) Patent No.: US 9,623,976 B2
(45) Date of Patent: Apr. 18, 2017

(54) NACELLE FOR A HIGH BYPASS RATIO ENGINE WITH MULTIPLE FLOW PATHS

(71) Applicant: Rohr, Inc., Chula Vista, CA (US)

(72) Inventors: Norman J. James, San Diego, CA (US); Keith Ritchie, San Diego, CA (US); Thomas W. Scott, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 771 days.

(21) Appl. No.: 13/951,229

(22) Filed: Jul. 25, 2013

(65) Prior Publication Data

US 2014/0271169 A1    Sep. 18, 2014

Related U.S. Application Data

(60) Provisional application No. 61/675,718, filed on Jul. 25, 2012.

(51) Int. Cl.
   *B64D 29/00* (2006.01)
   *B64D 33/04* (2006.01)

(52) U.S. Cl.
   CPC ............. *B64D 29/00* (2013.01); *B64D 33/04* (2013.01)

(58) Field of Classification Search
   CPC ............ B64D 29/00; B64D 33/04; F02K 1/74
   See application file for complete search history.

(56) References Cited

U.S. PATENT DOCUMENTS

| | | | | |
|---|---|---|---|---|
| 3,032,981 A | * | 5/1962 | Lawler | F02K 1/42 181/215 |
| 3,477,231 A | * | 11/1969 | Paulson | B64D 33/02 181/214 |
| 3,570,247 A | * | 3/1971 | Denning et al. | F02K 1/58 239/265.19 |
| 3,598,318 A | * | 8/1971 | Schiel | F02K 1/06 239/265.13 |
| 3,829,020 A | * | 8/1974 | Stearns | F02K 1/09 181/216 |
| 3,831,376 A | * | 8/1974 | Moorehead | F02K 1/827 239/265.29 |
| 3,875,742 A | * | 4/1975 | McMurtry | F02K 1/72 239/265.31 |
| 3,877,663 A | * | 4/1975 | Curran | B64D 33/04 239/265.19 |
| 4,073,440 A | * | 2/1978 | Hapke | F02K 1/74 239/265.29 |
| 4,373,328 A | * | 2/1983 | Jones | F02K 1/72 239/265.27 |
| 4,791,783 A | * | 12/1988 | Neitzel | F01D 17/162 60/226.3 |
| 4,817,756 A | * | 4/1989 | Carr | B64D 29/00 181/213 |

(Continued)

*Primary Examiner* — Craig Kim
*Assistant Examiner* — Eldon Brockman
(74) *Attorney, Agent, or Firm* — Snell & Wilmer L.L.P.

(57) ABSTRACT

Nacelle air management systems for a high bypass ratio engine are provided. The nacelles air management systems may include an outer cowl and an inner cowl that are configured to provide dual bypass flow channels around an engine core. These systems may be employed to accommodate larger engine fans. The nacelle air management system may also include one or more blocker doors are configured to at least partial obstruct and/or direct air from the dual bypass flow channels to create reverse thrust.

15 Claims, 18 Drawing Sheets

(56) References Cited

U.S. PATENT DOCUMENTS

| | | | | |
|---|---|---|---|---|
| 5,201,801 | A * | 4/1993 | Smith, Jr. | F02C 7/05 60/226.1 |
| 5,261,227 | A * | 11/1993 | Giffin, III | F01D 17/162 60/226.1 |
| 5,562,419 | A * | 10/1996 | Crall | F01D 5/225 416/190 |
| 5,915,651 | A * | 6/1999 | Asaki | B64D 29/00 239/265.29 |
| 6,901,739 | B2 * | 6/2005 | Christopherson | F01D 17/105 60/226.3 |
| 2004/0068978 | A1 * | 4/2004 | Lair | F02K 1/70 60/226.2 |
| 2005/0072158 | A1 * | 4/2005 | Christopherson | F01D 17/105 60/761 |
| 2009/0188233 | A1 * | 7/2009 | Vauchel | F02K 1/09 60/226.2 |
| 2010/0072324 | A1 * | 3/2010 | Teulou | B64D 29/06 244/53 R |
| 2011/0120075 | A1 * | 5/2011 | Diaz | B64D 29/00 60/39.11 |
| 2013/0062433 | A1 * | 3/2013 | Vauchel | B64D 29/06 239/265.19 |
| 2013/0062434 | A1 * | 3/2013 | Vauchel | B64D 29/06 239/265.19 |

* cited by examiner

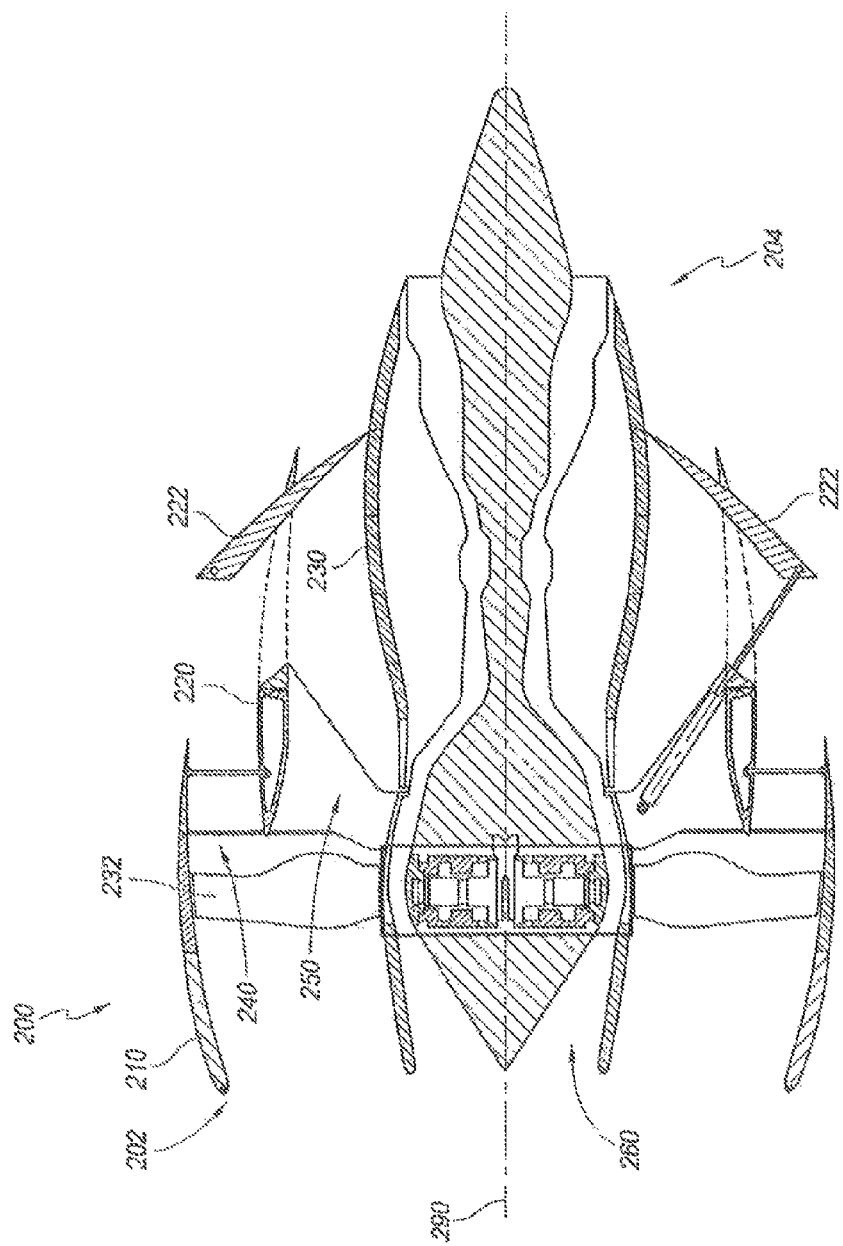

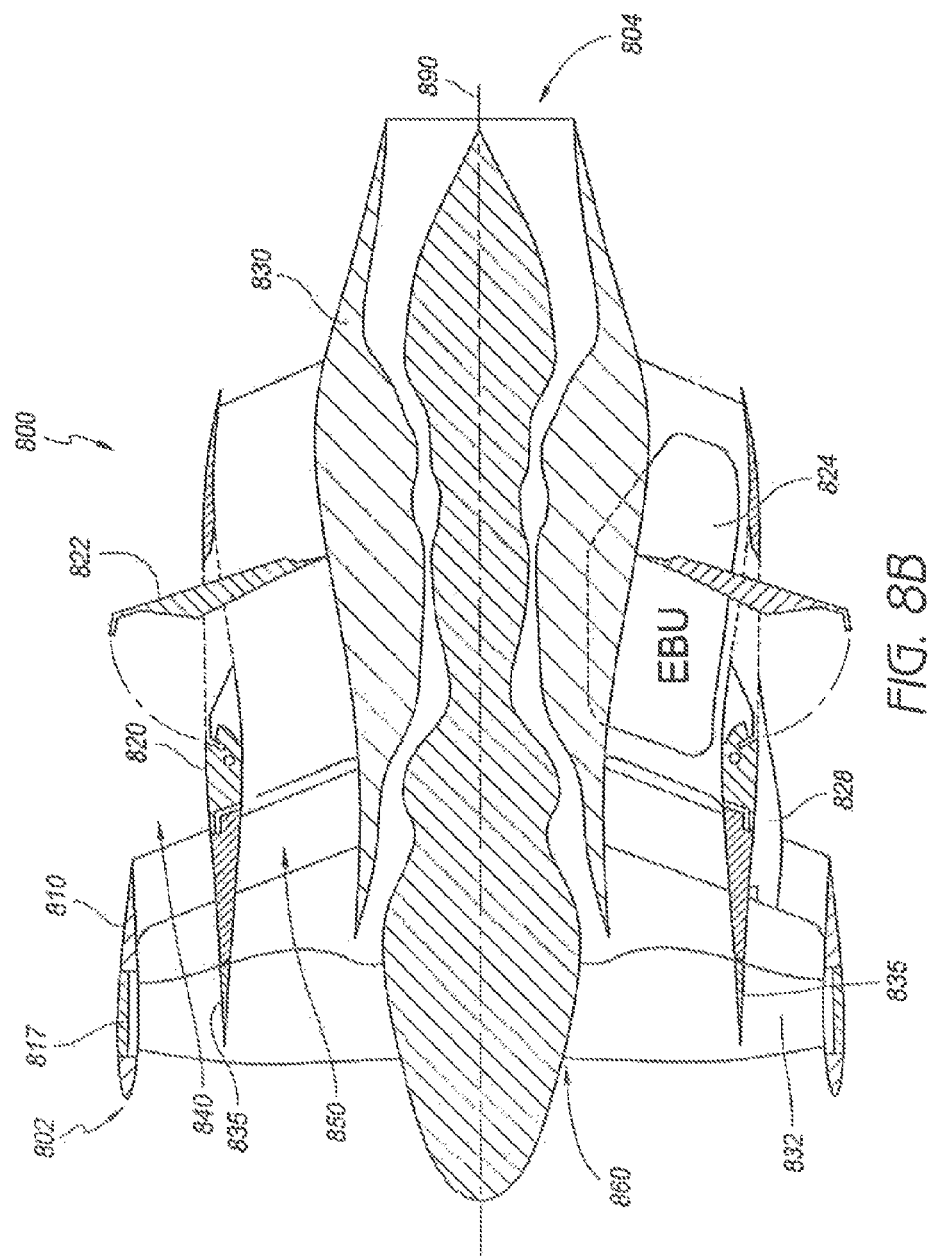

NACELLE FOR A HIGH BYPASS RATIO ENGINE WITH MULTIPLE FLOW PATHS

CROSS REFERENCE TO RELATED APPLICATIONS

This application claims priority to, and the benefit of, U.S. Provisional Patent Application Ser. No. 61/675,718, entitled "NACELLE," filed on Jul. 25, 2012. The '718 Application is hereby incorporated by reference in its entirety for all purposes.

FIELD

This application relates generally to engine nacelles, and more specifically, to engine nacelles and/or fan blades which include a splitter cowl.

BACKGROUND

A nacelle is an enclosure, casing, or housing that holds an engine and/or other equipment on an aircraft. Nacelles are often coupled to an underside of a wing, for example, by a pylon. Nacelles are typically made from one or more pieces or cowls which occupy clearance space underneath an associated wing, contribute to mass loads on the associated wing and aircraft, and contribute to drag forces on the aircraft.

SUMMARY

In various embodiments, a nacelle may comprise a first cowl, an engine core, a fan and a second cowl. The first cowl may define an inlet. The engine core may be disposed at least partially within the first cowl. The fan may be coupled to the engine core and configured to rotate within the first cowl. The second cowl may be radially offset from the first cowl. The second cowl may be configured to separate a flow of air passing through the fan into at least a first flow path and a second flow path. The first flow path may be disposed radially outward of the second cowl and the second flow path may be disposed between the first flow path and the engine core.

In various embodiments, a flow splitter system may comprise an outer cowl, a splitter cowl and a fan. The splitter cowl may be at least partially enclosed by the outer cowl. The fan may be disposed within the outer cowl. The fan may be configured to conduct an airflow through a portion of the outer cowl and the splitter cowl. The fan may be driven by an aircraft engine core.

In various embodiments, a thrust reverser system may comprise a first cowl and a second cowl. The first cowl may be configured to define a first flow passage. The second cowl may be disposed within the first cowl. The second cowl may be configured to define a second flow passage. The second cowl may comprise a plurality of blocker doors. A fan of an aircraft engine may be configured to conduct air through the first flow passage and the second flow passage in response to the aircraft engine operating.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3A is a cross-sectional view of a nacelle in a reverse thrust configuration, in accordance with various embodiments.

FIG. 8B is a cross-sectional view of a nacelle in a reverse thrust configuration, in accordance with various embodiments.

DETAILED DESCRIPTION

Figure 1:
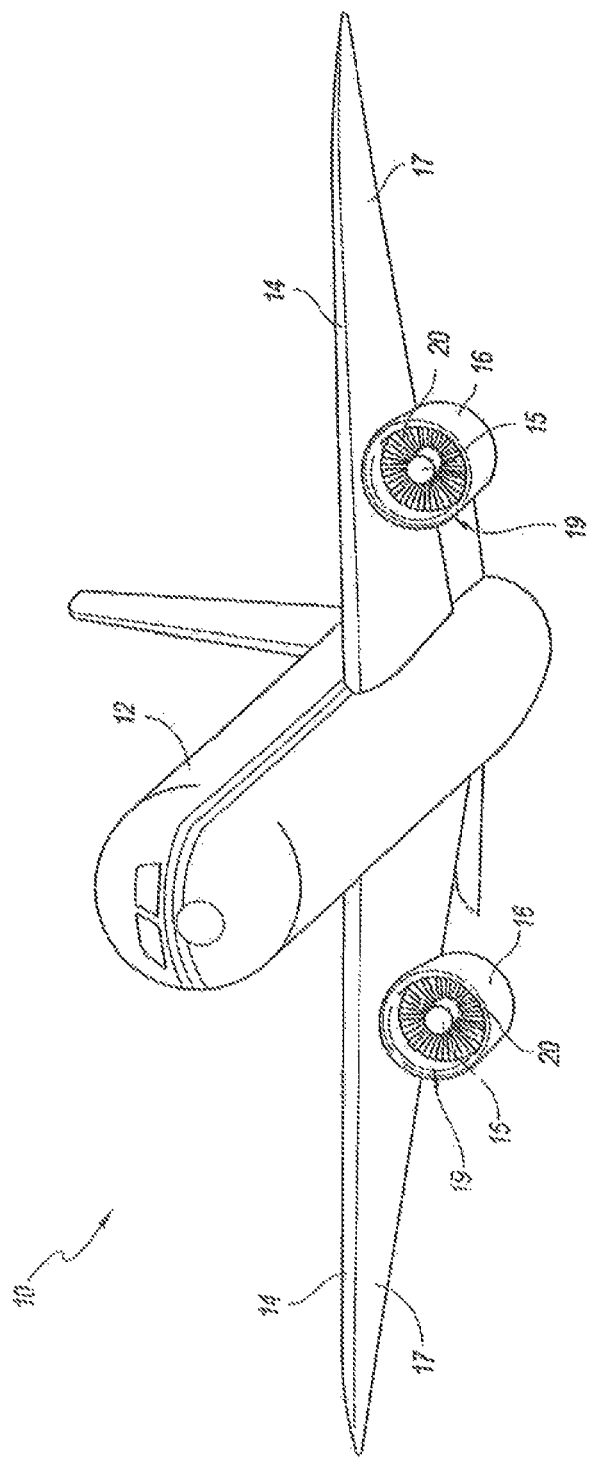
FIG. 1 is a perspective view of an aircraft including a pair of nacelles located on the undersides of the wings, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight.

Different cross-hatching may be used throughout the figures to denote different parts, but not necessarily to denote the same or different materials.

Various embodiments disclosed herein relate to nacelles that at least partially house or enclose a high bypass ratio engine. A high bypass ratio engine receives air through a fan disposed near an inlet of the nacelle, combusts the received air with fuel within a combustion chamber, and provides an exhaust jet through a rear-facing nozzle or outlet to propel the aircraft in a forward direction. Additionally, high bypass ratio engines also receive a substantial amount of air through the inlet of the nacelle that is passed over, or that bypasses, the engine core to provide additional thrust. The bypass air is combined with the exhaust jet and improves fuel efficiency and engine noise. In various embodiments, the bypass air alone can be used to provide forward thrust for the aircraft. Existing high bypass ratio engines can require a substantial amount of clearance between an exterior surface of the engine and the interior surface of the nacelle to accommodate the additional bypass air within the nacelle. This added clearance may increase the overall size of the nacelle which may reduce the clearances between the nacelle, the wing, and a landing surface.

Nacelles disclosed herein can at least partially house or enclose a high bypass ratio engine and can include one or more cowls that are oriented relative to the fan of the bypass engine so as to split, divide, divert, and/or separate the bypass air between an inner flow channel, duct, passage, or path and an outer flow channel, duct, passage, or path. In this way, a "splitter" cowl can divert the bypass air between at least a first flow path and a second flow path that is disposed between the first flow path and the engine core. By extending the flow path of bypass air radially outward beyond the nozzle or, outlet of the nacelle (e.g., by allowing bypass air to flow over the outside of the splitter cowl), the engine build up and thrust reverse structures may be sized significantly smaller than conventional nacelles, which can provide cost and weight savings. Decreasing the size of the outer aft profile of the nacelle can also limit an under wing cross-sectional profile of the nacelle to reduce drag, can allow for the nacelle to be positioned higher relative to the wing to provide for more underlying clearance, and/or can allow for the use of larger diameter fans which partially extend above the wing.

In various embodiments, a nacelle including a splitter cowl can also include one or more blocker doors configured to divert or block bypass air passing through the first and/or second bypass flow paths. Such doors can be disposed at the outlet of the nacelle or forward of the outlet. The blocker doors can be actuated or closed to limit the forward thrust provided by the bypass air and/or to provide reverse thrust. The blocker doors can also be actuated or expanded at certain pressure conditions, for example, at low altitudes or when fan pressure exceeds a threshold limit. A splitter cowl may extend aft from the aft-most portion of the fan blades and balances duct pressures between the first and second bypass flow paths when in a reverse thrust configuration, in various embodiments one or more fan blades include a flow splitting or diverting structure disposed relative to a downstream splitter cowl. For example, the flow splitting structure may be aligned with the downstream splitter cowl to improve dynamic separation of the bypass flows at the fan. In this way, the fan itself contributes in diverting, splitting, or separating bypass air into two or more bypass flow paths before the air reaches the downstream splitter cowl.

In various embodiments, a nacelle can include a variable area fan nozzle ("VAFN") cowl configured to vary an outlet area through which the exhaust jet and bypass air pass through. For example, a nacelle enclosing a high bypass ratio engine with a relatively low-pressure fan type may include a VAFN to adjust for the low fan pressure.

FIG. 1 is a perspective view of an aircraft 10 having a fuselage 12 and a pair of wings 14 extending laterally from the fuselage 12. A nacelle 16 is coupled to an underside 17 of each wing 14. Although not illustrated in FIG. 1, in various embodiments, each nacelle 16 is coupled to a wing 14 by a pylon, or any other suitable structure capable of coupling a load to a wing.

Each nacelle 16 houses an aircraft engine 15, for example, a high bypass ratio engine. As mentioned herein, a high bypass ratio engine 15 receives air through a fan 20 disposed near an inlet 19 of the nacelle 16, combusts the received air with fuel within a combustion chamber, and provides an exhaust jet through a rear-facing nozzle or outlet to propel the aircraft 10 in a forward direction. Additionally, high bypass ratio engines also receive a substantial amount of air through the inlet 19 of the nacelle 16 that is passed over, or that bypasses, the engine 15 to provide additional thrust. The bypass air is combined with the exhaust jet and improves fuel efficiency and engine noise. In various embodiments, the nacelle 16 can include a VAFN cowl configured to vary an outlet area through which the exhaust jet and bypass air pass through.

During flight, air flows through the inlet 19 of each nacelle 16 as well as over the outer surfaces of each nacelle 16. The air that flows through the inlet 19 may divide, separate, split, or divert into two or more separate flow paths. For example, air that flows through the inlet 19 may be divided between a path that flows through the engine core and a separate path that bypasses the engine core between the outer surface of the nacelle and the outside of the engine core. In this way, the outlet of the nacelle 16 can exhaust an engine jet and/or bypass air which has passed over the engine core. Because a high bypass ratio engine requires a substantial amount of bypass air to provide effective thrust to the nacelle 16, the space between the engine core and the outer surface of the nacelle can be significant if all the bypass air is confined between the engine core and the outer surface of the nacelle. As discussed above, In various embodiments disclosed herein, bypass air may be divided, split, diverted, and/or separated into two or more flow paths with at least one flow path disposed outside of the nacelle to limit the outer profile or cross-sectional area of the outlet of the nacelle 16.

To assist in the description of the nacelles described below with reference to the figures, the following coordinate terms are used, consistent with the coordinate axes illustrated. A "longitudinal axis" is generally parallel to an axis of the nacelle that extends between the inlet and outlet of the nacelle. A "lateral axis" is normal to the longitudinal axis and is generally parallel to a wing associated with the nacelle. A "transverse axis" extends normal to both the longitudinal and lateral axes. In addition, as used herein, "the longitudinal direction" refers to a direction substantially parallel to the longitudinal axis; "the lateral direction" refers to a direction substantially parallel to the lateral axis; and "the transverse direction" refers to a direction substantially parallel to the transverse axis. Further, a radial direction refers to a direction that extends perpendicular to the longitudinal axis and a "radial distance" refers to a distance measured between the longitudinal axis and another point on a radial direction.

The terms "upper," "lower," "top," "bottom," "underside," "upperside" and the like, which may be used to describe nacelles and related components in the discussion below, are used in reference to the illustrated orientation of the embodiments. For example, the term "upperside" is used to describe the portion of a nacelle that is disposed above an engine housed within the nacelle. The term "underside" is used to describe the portion of the nacelle that is located below a plane that passes through the longitudinal axis of the nacelle or the portion of a wing that faces an associate nacelle. Additionally, the adverbs or adjectives "aft" and "fore" are used with reference to the rear and front sides of a nacelle, respectively. For example, the term "aft" means toward the rear or outlet of a nacelle and the term "fore" means towards the front or inlet of a nacelle. The terms "inboard" and "outboard" are used with reference to an airframe or fuselage ultimately coupled to the nacelle. For example, an "inboard" surface of a nacelle may face toward an airframe or fuselage when the nacelle is coupled to the airframe while an "outboard" surface of the nacelle may face away from the airframe or fuselage. In this way, an "inboard" side of a nacelle may be disposed between the "outboard" side of the nacelle and the fuselage when the nacelle is coupled indirectly to the fuselage, for example, via a wing.

Figure 2A:
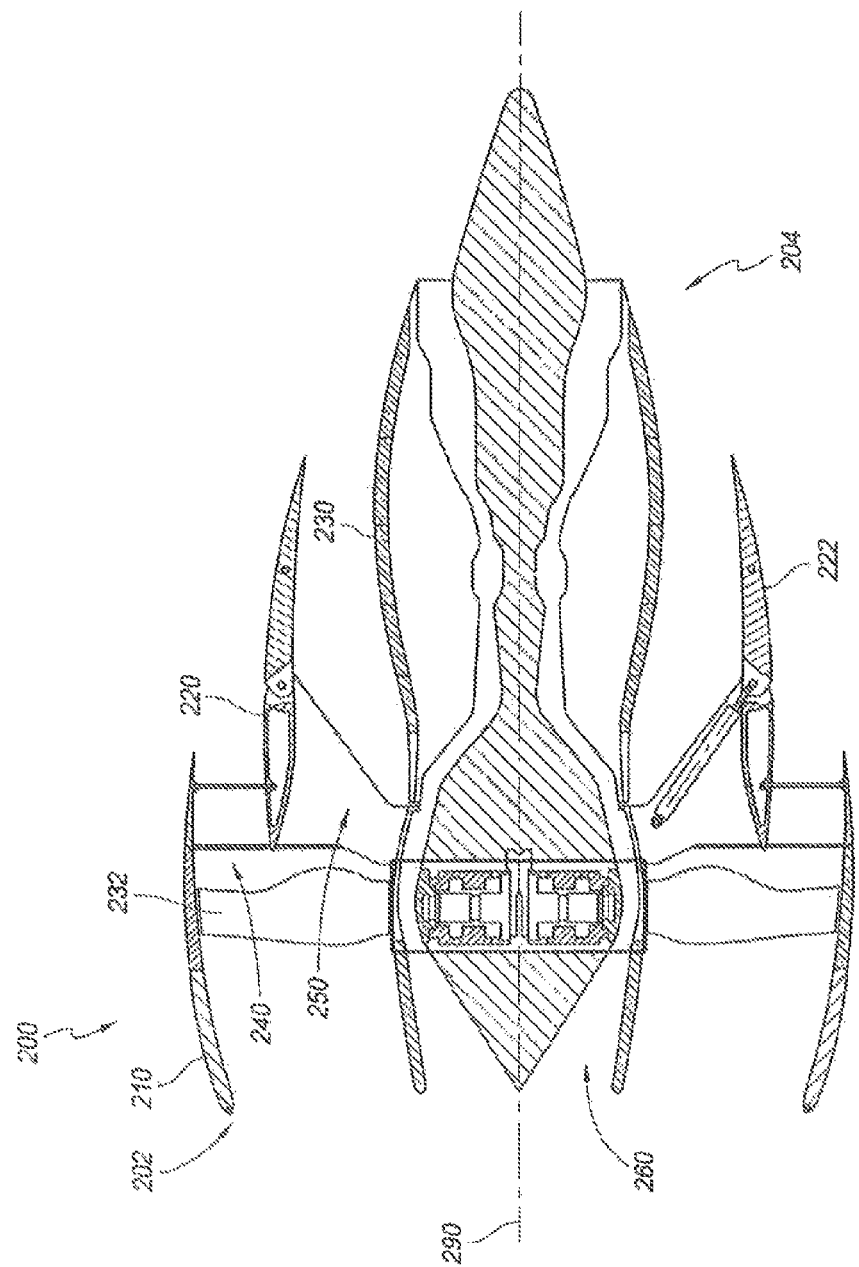
FIG. 2A is a cross-sectional view through of a nacelle that includes a split cowling while in a forward thrust configuration, in accordance with various embodiments.
Figure 2B:
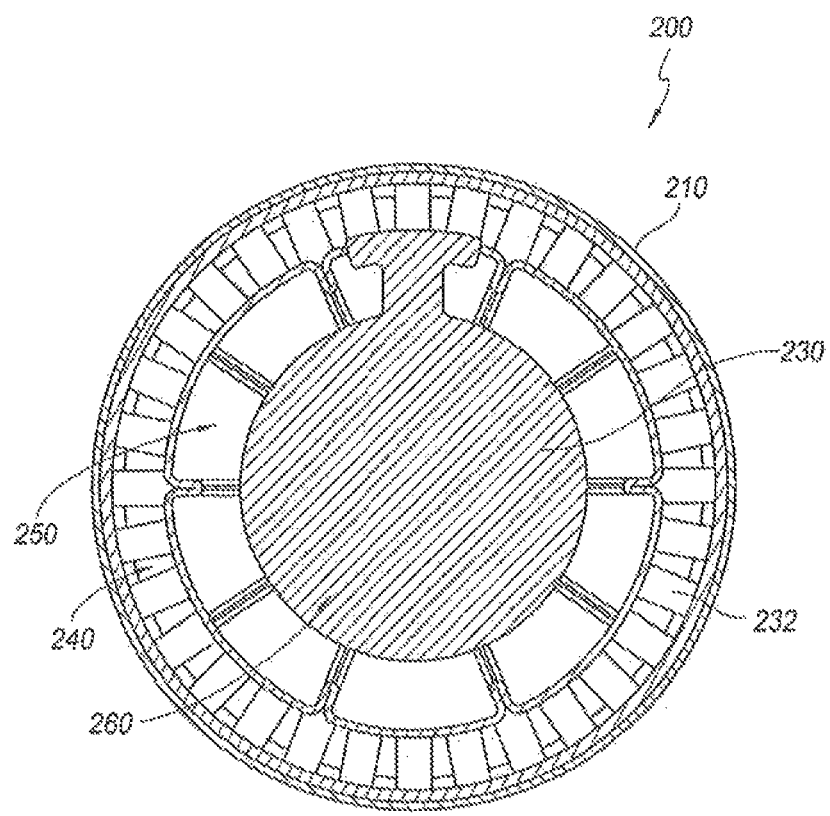
FIG. 2B is a rear view of a nacelle, in accordance with various embodiments.
Figure 2C:
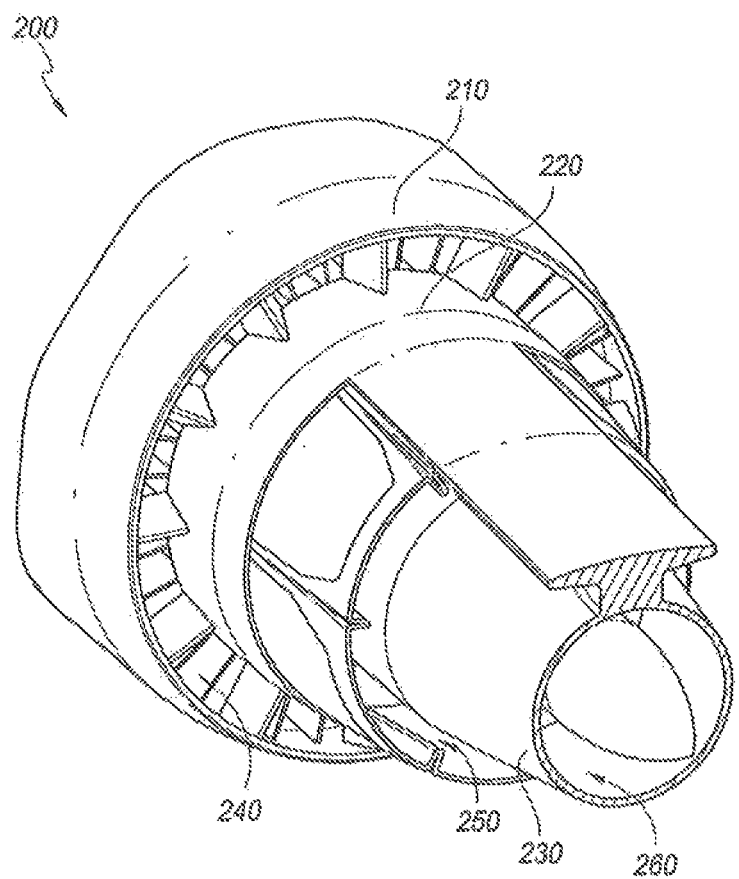
FIG. 2C is a rear perspective view of a nacelle, in accordance with various embodiments.

In various embodiments, FIGS. 2A-2C illustrate a nacelle 200 that includes a split cowling when in a forward thrust configuration. The nacelle 200 includes an inlet 202 defined by an inlet cowl 210 and an outlet 204 disposed aft of a splitter or outlet cowl 220. The inlet cowl 210 and outlet cowl 220 of the nacelle 200 can at least partially house or enclose an engine core 230 which extends along a centerline or longitudinal axis 290 of the nacelle 200. The engine core 230 is coupled to a fan 232 which rotates about the longitudinal axis 290 of the nacelle within the inlet cowl 210.

As mentioned herein, during flight the nacelle 200 and engine core 230 can provide a forward thrust to an associated aircraft. When the nacelle 200 is in a forward thrust configuration, air is drawn into the nacelle 200 through the inlet 202 by the fan 232. The drawn in air flows into the engine core 230 or passes over or bypasses the engine core 230. As shown in FIGS. 2A and 2C, the splitter cowl 220 is offset from, and disposed radially inward of, the inlet cowl 210. In this way, the bypass air that flows through the inlet 202 and over (e.g., radially outward of) the engine core 230 is diverted, split, separated, or divided between a first flow path 240 and a second flow path 250 with the second flow path 250 being disposed between the first flow path 240 and the engine core 230 in the radial direction. As shown in FIGS. 2A and 2B, air that is drawn into the nacelle 200 through the inlet cowl 210 can flow through the first flow path 240, the second flow path 250, or a third flow path 260 through the engine core 230, and exit the nacelle 200 to provide a forward thrust.

In various embodiments, because the bypass air can be split between the first flow path 240 over the splitter cowl 220 and the second flow path 250 within the splitter cowl 220, the splitter cowl 220 can be significantly inset in the radial direction relative to the inlet cowl 210 while still providing sufficient bypass flow. For example, the splitter cowl 220 can have a diameter that is 70% or less than a diameter of the inlet cowl 210. As a result, the smaller outer aft profile of the splitter cowl 220 decreases the drag profile of this portion of the nacelle 200 and allows the nacelle 200 to be positioned higher relative to an associated wing. In this way, the nacelle 200 can reduce drag and improve clearance between the nacelle 200 and a wing and/or between the nacelle 200 and a ground surface as compared with conventional nacelles that do not include a radially offset splitter cowl 220.

Figure 3B:
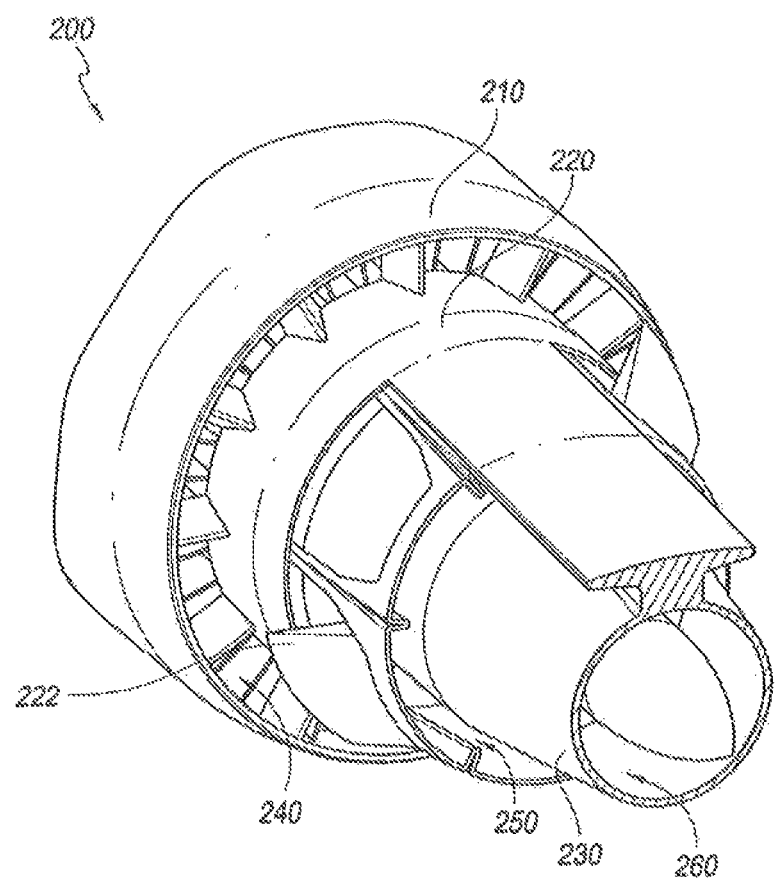
FIG. 3B is a rear perspective view of a nacelle, in accordance with various embodiments.

In various embodiments and with reference to FIGS. 3A and 3B, the nacelle 200 of FIGS. 2A-2C is illustrated in a reverse thrust configuration. In various embodiments, portions of the splitter cowl 220 of the nacelle 200 form one or more blocker doors 222. The blocker doors 222 are disposed on the aft end of the splitter cowl 220. The blocker doors 222 may rotate, articulate, or flex inward toward the longitudinal axis 290 of the nacelle 200 to block, impinge, occlude, or divert portions of the first bypass flow path 240 and/or second bypass flow path 250. In this way, bypass air flowing through the first or second flow paths 240, 250 can be at least partially diverted or blocked. In various embodiments, the blocker doors 222 move or actuate together or collectively to contact the outside of the engine core 230. In this regard, the second flow path 250 disposed between the engine core 230 and the splitter cowl 220 may be substantially blocked or diverted by the doors 222. Further, in such a configuration, the fore-most portion of the doors 222 may extend at least partially into the first bypass flow path 240 thereby blocking or diverting at least a portion of air in the first flow path 240. For example, the second flow path 250 can be completely blocked (e.g., approximately 100% blocked) by the blocker doors 222 and the first flow path 240 can be partially blocked (e.g., about 60% blocked or more), at the same time. Moreover, one or more of the blocker doors 222 may close while one or more of the blocker doors 222 remains open.

As shown in FIG. 3A, when the blocker doors 222 are actuated the bypass air that is blocked or diverted by the blocker doors 222 within the first or second flow paths 240, 250 can be diverted or redirected toward the inlet of the nacelle. By diverting or redirecting the flow of air that passes into the inlet 202 back towards the inlet 202, the blocker doors provide a reverse thrust to the nacelle 200 (e.g., a force that thrusts the nacelle from left to right as illustrated in FIG. 3A). In various embodiments, the blocker doors 222 can be framed, for example, by a picture frame, to maintain pressure integrity in the duct during cruise. In embodiments that do not include a VAFN, the frame can be replaced with a fixed cowl that the blocker doors 222 hinge out of.

Figure 4A:
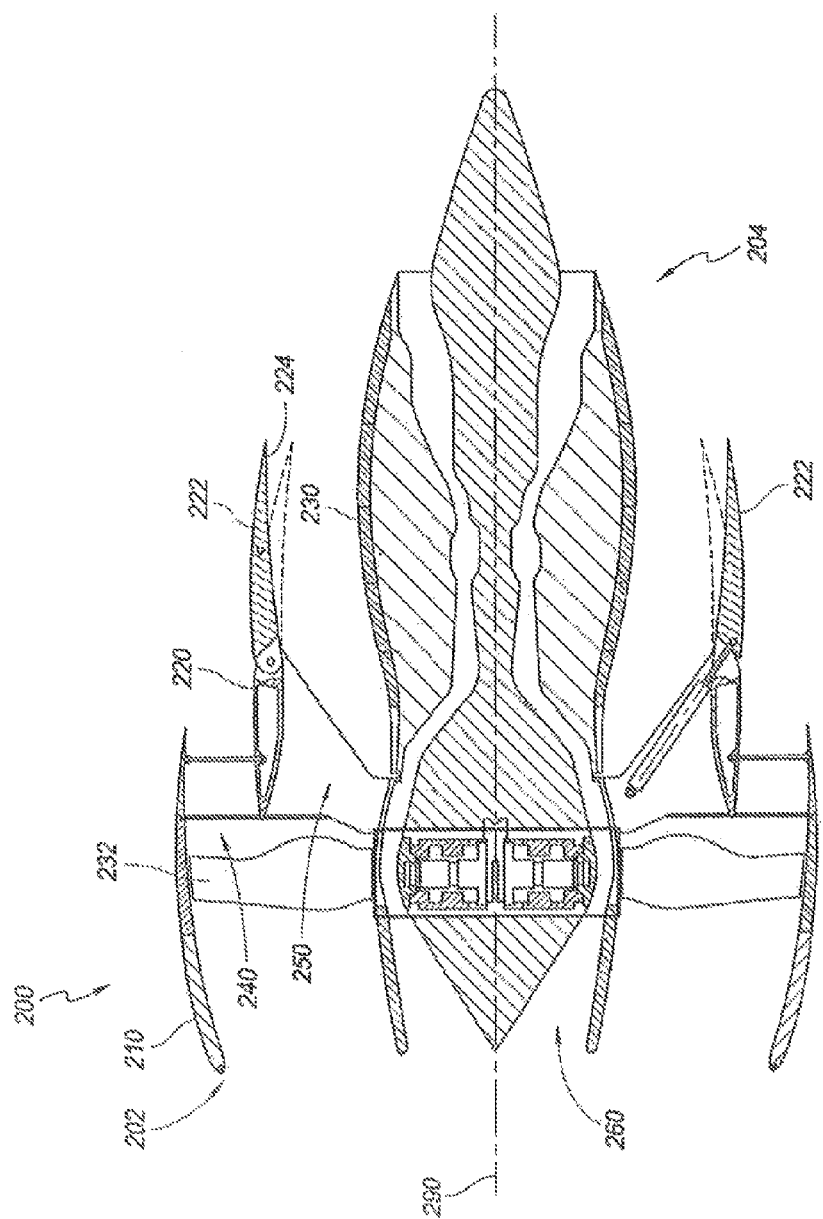
FIG. 4A is a cross-sectional view of a nacelle in an expanded nozzle configuration, in accordance with various embodiments.
Figure 4B:
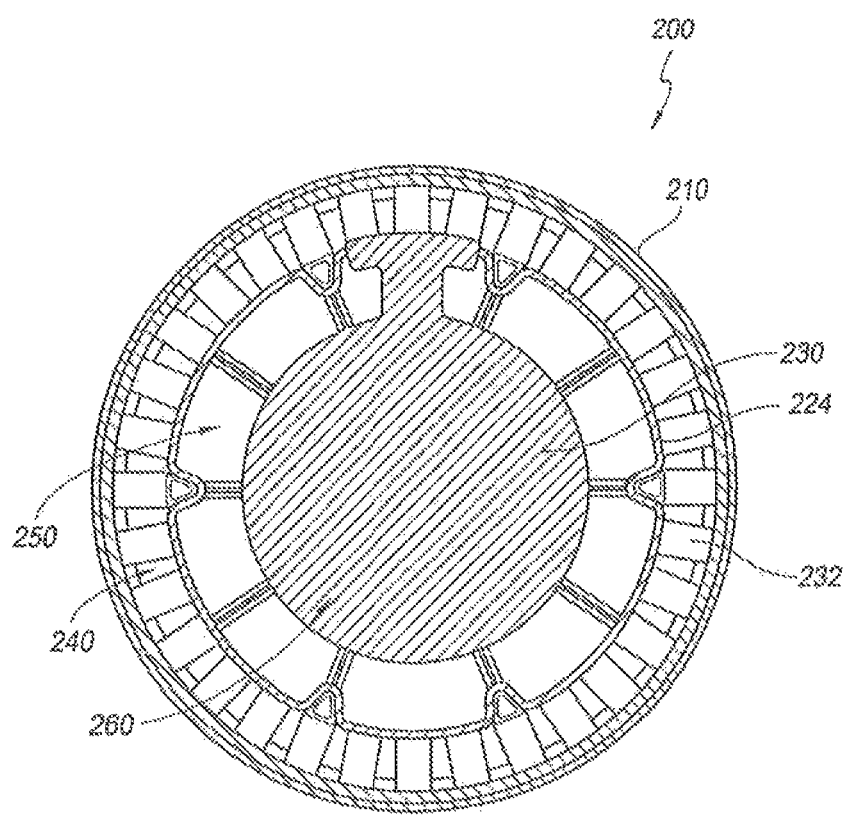
FIG. 4B is a rear view of a nacelle, in accordance with various embodiments.
Figure 4C:
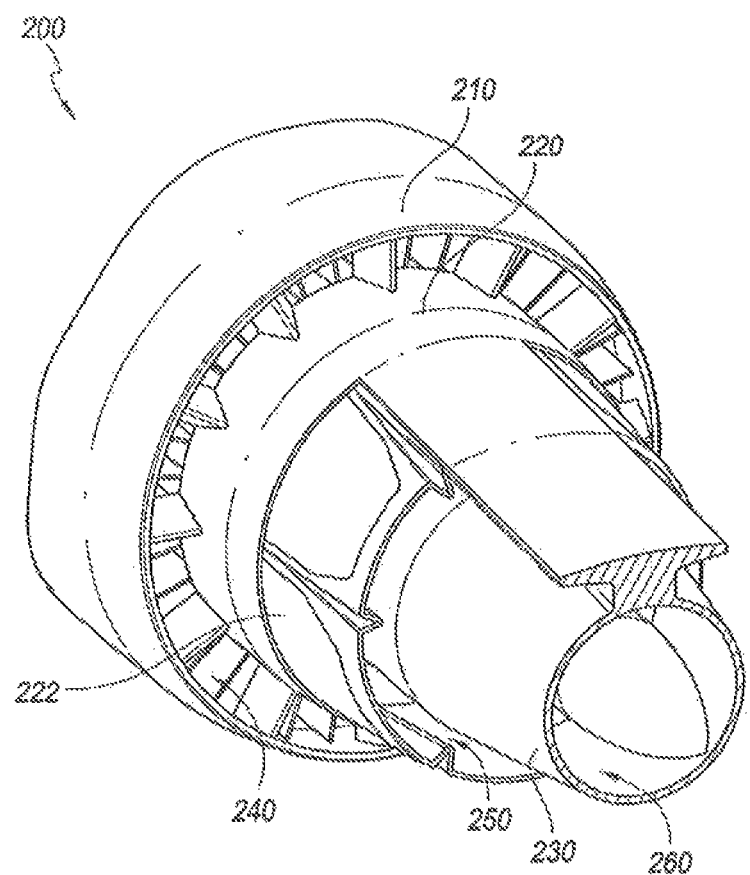
FIG. 4C is a rear perspective view of a nacelle, in accordance with various embodiments.

FIGS. 4A-4B illustrate the nacelle 200 of FIGS. 2A-3C in an expanded nozzle configuration. As shown, the blocker doors 222 of the splitter cowl 220 can optionally expand or open. This expansion can occur when pressure from the fan 232 exceeds a given value within the second bypass flow path 250. In various embodiments, the expansion of the blocker doors 222 may be controlled by one or more seals or resilient members. For example, an integral "U" spring seal and picture frame assembly 224 can be sized to hold the nozzle or outlet 204 of the splitter cowl 220 until a threshold pressure is attained and then allow the blocker doors 222 to expand away from the longitudinal axis of the nacelle to decrease pressure within the second flow path 250.

Figure 5:
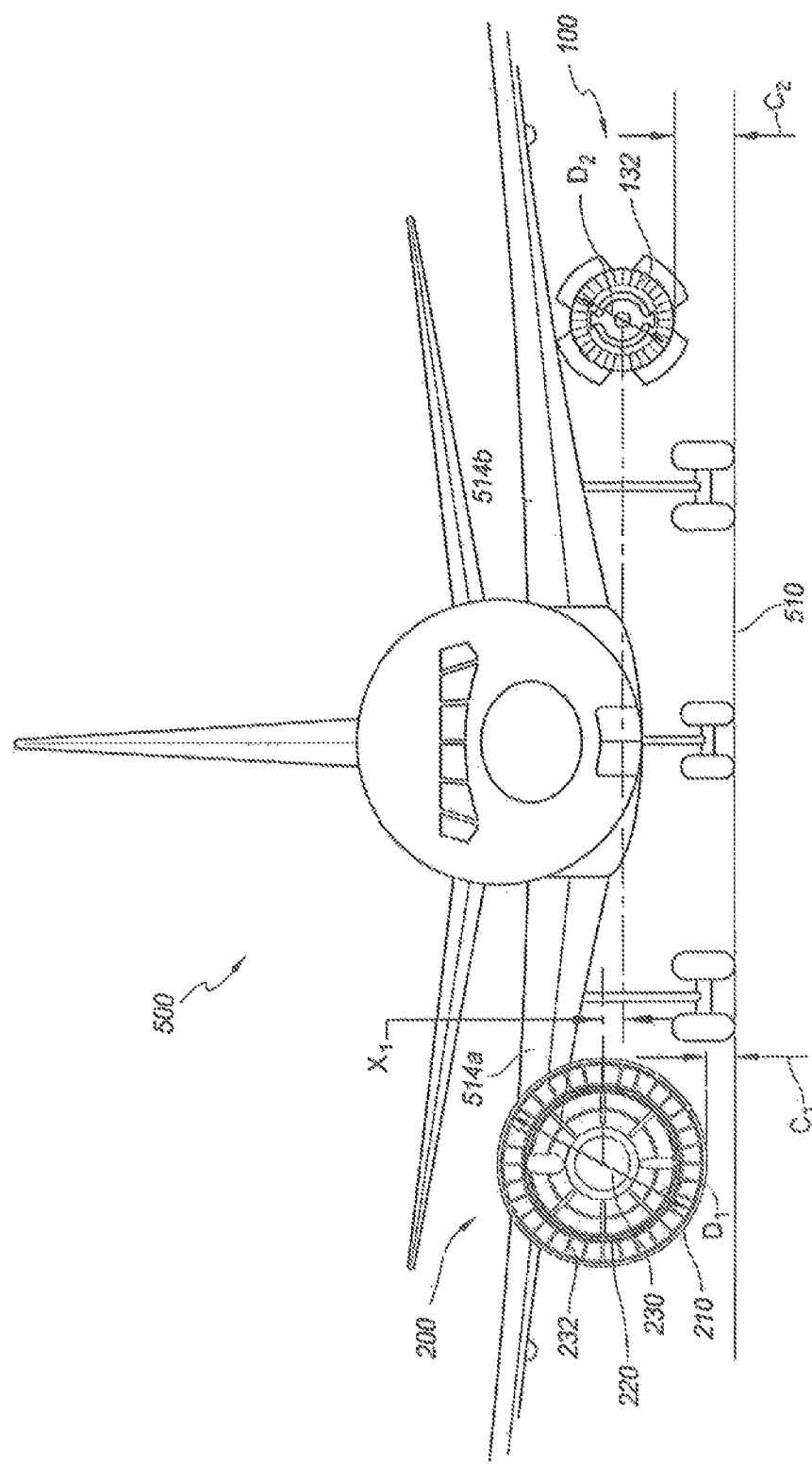
FIG. 5 is a front view of an aircraft including a nacelle coupled to a first wing and a differently configured nacelle coupled to a second wing, in accordance with various embodiments.

FIG. 5 is a front view of an aircraft 500 including a pair of nacelles 100, 200 with each nacelle being coupled to an underside of one of the wings 514a, 514b of the aircraft. Nacelle 100 houses a high bypass ratio engine. However, as with other conventional nacelles for high bypass ratio engines, the nacelle 100 does not include a splitter cowl. As a result, all of the bypass air drawn through the inlet of the nacelle 100 must pass over the engine core within the nacelle 100 which requires a significant gap be maintained between the outside surface of the nacelle 100 and the engine core aft of the inlet or fan 132. Additionally, the maximum size of the fan 132 is limited because the fan 132 is disposed within the outer surface of the nacelle 100 which extends aft and below the wing 514b.

The opposing nacelle 200 may be configured similar to the nacelles 200 illustrated in FIGS. 2A-4C. In this way, the nacelle 200 includes a splitter cowl 220 disposed aft of the fan 232 to split or divide the bypass air between at least a first flow path disposed outside of the nacelle 200 and a second flow path disposed within the nacelle 200 between the splitter cowl 220 and the engine core 230. Because the splitter cowl 220 splits, diverts, or divides at least a portion of the bypass air outside of the nacelle 200, the cross-sectional area of the nacelle 200 aft of the fan (e.g., the cross-sectional area of the splitter cowl and enclosed area) can be significantly reduced as compared with the other nacelle 100. Moreover, because the diameter $D_1$ of the fan 232 may be greater than the diameter of the nacelle aft of the fan 232 due to the splitting of bypass air flow between the nacelle 200 and over the nacelle 200, the fan 232 can extend transversely above and in front of its associated wing 514a. Therefore, the diameter $D_1$ of the fan 232 can be significantly greater than the diameter $D_2$ of the fan 132.

Due to the structural differences between the opposing nacelles 100, 200 as described above, the centerline of the nacelle 200 can be raised nearer to its associated wing 514a by a distance of $X_1$ as compared to the centerline of the nacelle 100 relative to its associated wing 514b. By raising the centerline of the nacelle 200, the clearance $C_1$ between the nacelle 200 and the ground surface 510 can be increased. A clearance $C_2$ for the smaller nacelle 100 is also illustrated in FIG. 5. Accordingly, FIG. 5 illustrates that embodiments of the nacelle can provide several advantages as compared to existing or conventional high bypass ratio engine nacelles. For example, the nacelle 200 can reduce drag forces present on the aircraft 500, can allow for the nacelle 500 to be positioned higher relative to the wing to provide for more underlying clearance $C_1$, and/or can allow for the use of a larger diameter $D_1$ fan 232 because the fan 232 can extend above the bottom of the wing 514a.

Figure 6A:
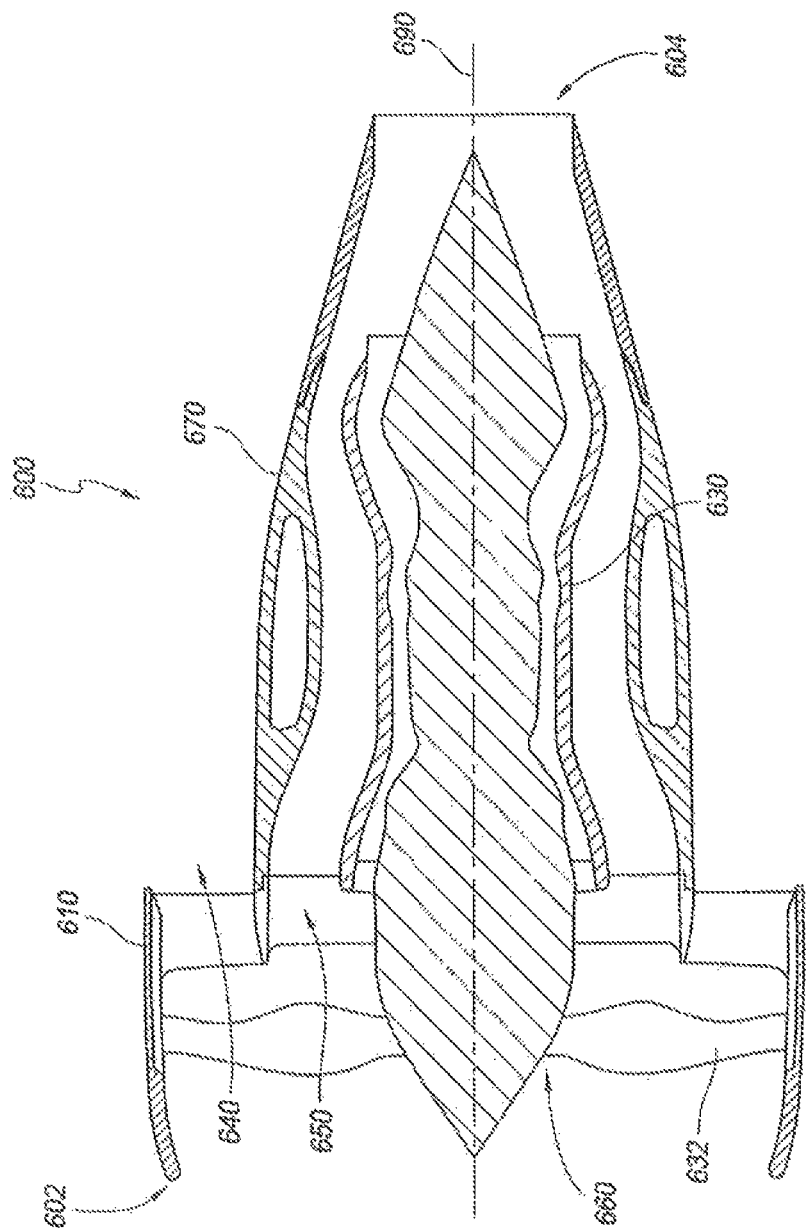
FIG. 6A is a cross-sectional view of a nacelle in a forward thrust configuration, in accordance with various embodiments.

FIG. 6A illustrates a cross-sectional view of another embodiment of a nacelle 600 with the nacelle 600 in a forward thrust configuration. As with the nacelle 200 of FIGS. 2A-5, the nacelle 600 includes an inlet cowl 610 and a splitter cowl 670. The nacelle 600 includes an inlet 602 defined by the inlet cowl 610 and an outlet 604 disposed aft of the splitter cowl 670. The inlet cowl 610 and the splitter cowl 670 at least partially house or enclose an engine core 630 which extends along the longitudinal axis 690 of the nacelle 600. The engine core 630 is coupled to a fan 632 which rotates about the longitudinal axis 690 of the nacelle within the inlet cowl 610.

Still referring to FIG. 6A, when the nacelle 600 is in the forward thrust configuration, air is drawn into the nacelle 600 through the inlet 602 by the fan 632. The drawn in air flows into the engine core 630 or passes over or bypasses the engine core 630. As with the nacelle 200 described herein, the splitter cowl 670 is offset from, and disposed radially inward of, the inlet cowl 610 and acts to split or separate bypass air that flows through the inlet cowl 610 between a first flow path 640 and a second flow path 650. The first flow path 640 is disposed radially outward of the splitter cowl 670 and the second flow path 650 is disposed radially inward of the splitter cowl 670 between the splitter cowl 670 and the engine core 630. In this way, at least some of the bypass flow can be diverted outside of the body of the splitter cowl 670 and nacelle 600 to reduce the space required between the splitter cowl 670 and the engine core 630 for bypass air. As with the nacelle 200 of FIGS. 2A-5, the nacelle 600 includes a third flow path 660 with extends through the engine core 630. In various embodiments, the second flow path 650 can be shaped to divert bypass air flowing therethrough radially inward. When shaped in this way, the second flow path 650 can reduce the impact of the splitter cowl 670 on the fan flow slip stream which can reduce drag forces on the nacelle 600 during flight.

Figure 6B:
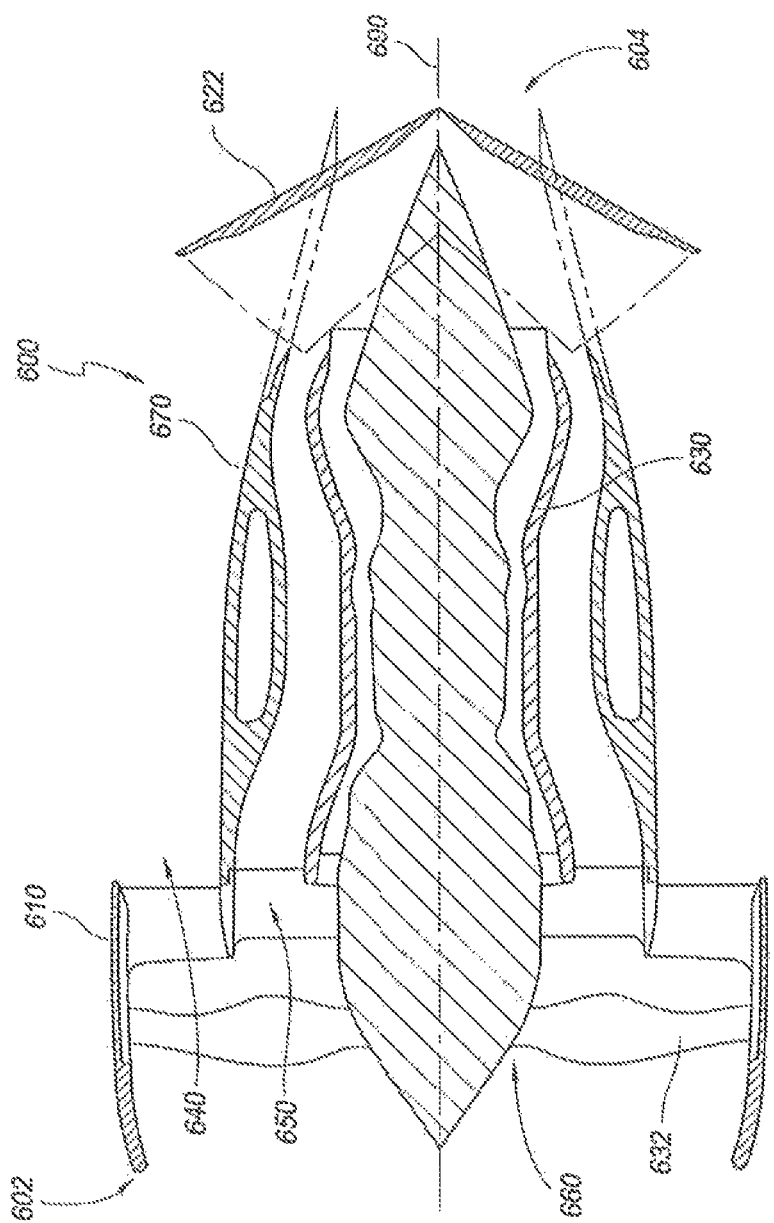
FIG. 6B is a cross-sectional view of a nacelle in a reverse thrust configuration, in accordance with various embodiments.

FIG. 6B illustrates a cross-sectional view of the nacelle 600 with the nacelle 600 in a reverse thrust configuration. Similar to the nacelle 200 of FIGS. 2A-5, the splitter cowl 670 of the nacelle 600 includes one or more blacker doors 622 configured to rotate, articulate, move, or flex inward relative to longitudinal axis 690 of the nacelle 600 to block, impinge, occlude, or divert portions of the first bypass flow path 640 and/or second bypass flow path 650. However, in this embodiment, the blocker doors 622 are disposed aft of the engine core 630 when in the reverse thrust configuration. As a result, the blocker doors 622 are configured to also block the third flow path 660 through the engine core 630, the second flow path 650 between the engine core 630 and the splitter cowl 670, and at least a portion of the first flow path 640 disposed radially outward of the splitter cowl 670. The blocker doors 622 can be configured to expand depending upon the pressure requirements of the second bypass flaw path 650.

Figure 7A:
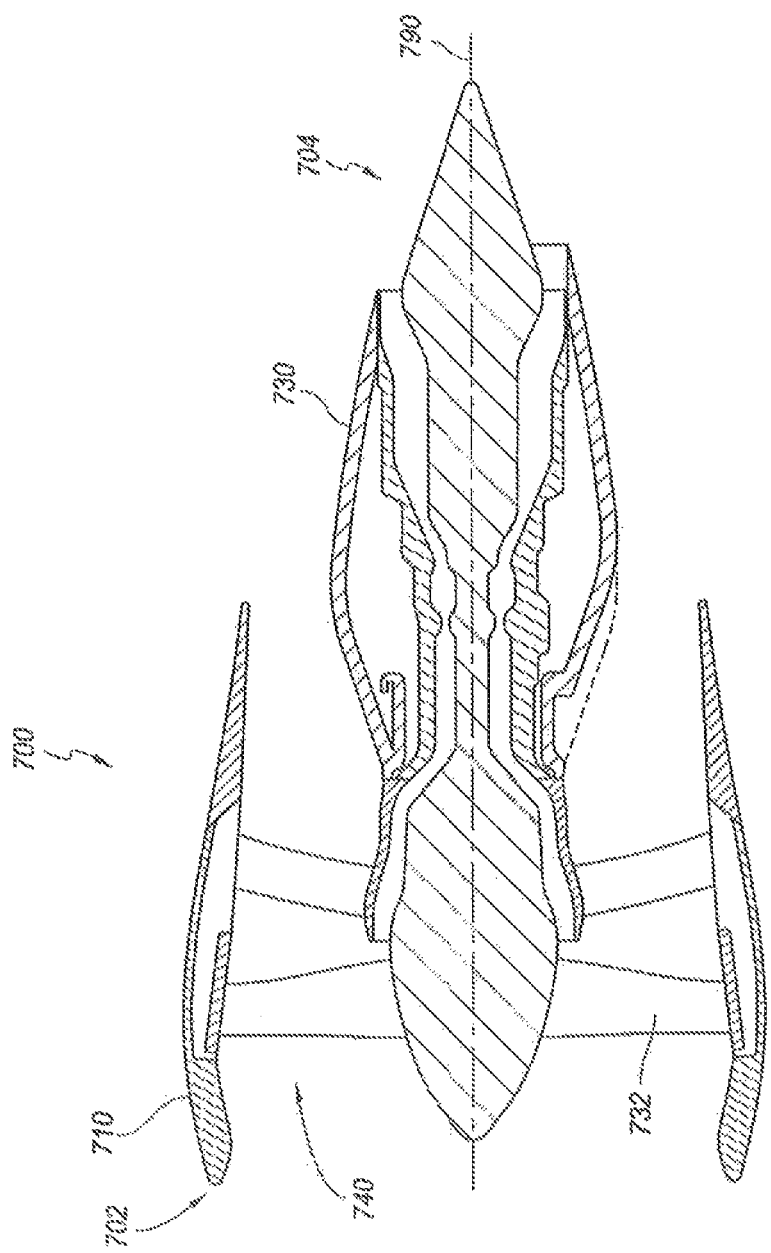
FIG. 7A is a cross-sectional view of a nacelle in a forward thrust configuration, in accordance with various embodiments.

FIG. 7A is a cross-sectional view of another embodiment of a nacelle 700 in a forward thrust configuration. As with the nacelles of FIGS. 2A-6B, the nacelle 700 includes an inlet cowl 710 which defines an inlet 702. An outlet 704 is disposed aft of the inlet cowl 710. The inlet cowl 710 partially houses an engine core 730 which extends along the longitudinal axis 790 of the nacelle 700. The engine core 730 is coupled to a fan 732 which rotates about the longitudinal axis 790 of the nacelle 700 within the inlet cowl 710.

In contrast to the nacelles of FIGS. 2A-6B, the nacelle 700 does not include a splitter cowl disposed between the inlet cowl 710 and the engine core 730 to divide or split the flow of bypass air between two or more flow paths. However, because the inlet cowl 710 has a relative short longitudinal length, the bypass flow path 740 is confined between the inlet cowl 710 and the engine core 730 for only a short distance before being unconfined in a radially outward direction over the engine core 730 upon exiting the inlet cowl 710. In this way, the inlet cowl 710 is disposed forward of the engine core 730 which allows for an increase in the bypass flow area soon after the bypass flow passes through the fan 732. Thus, the nacelle 700 may provide at least some of the advantages of the nacelles of FIGS. 2A-6B as compared to other nacelles.

Figure 7B:
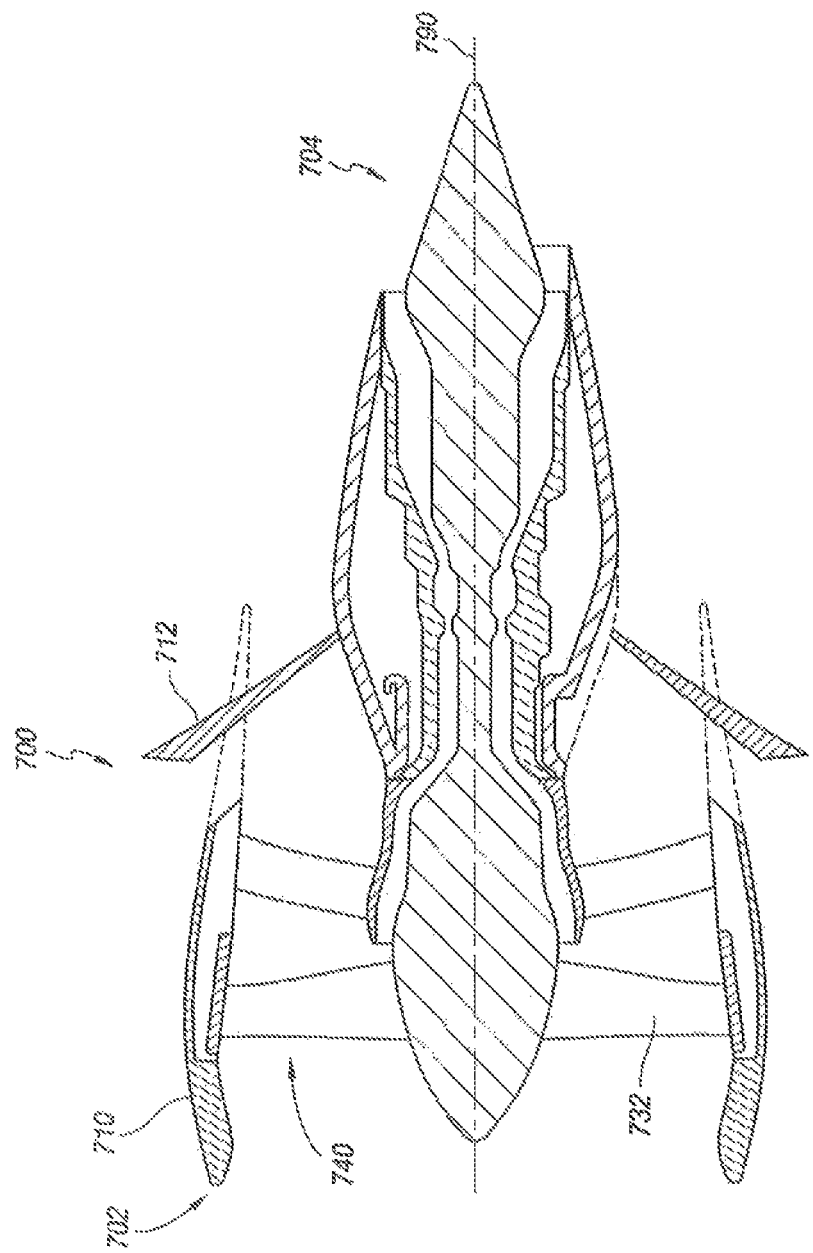
FIG. 7B is a cross-sectional view of a nacelle in a reverse thrust configuration, in accordance with various embodiments.

FIG. 7B is a cross-sectional view of the nacelle 700 with the nacelle 700 in a reverse thrust configuration. In this embodiment, the inlet cowl 710 includes one or more blocker doors 712 configured to rotate, articulate, move, or flex inward relative to longitudinal axis 790 of the nacelle 700 to block, impinge, occlude, or divert portions of the bypass flow path 740. In this way, the blocker doors 712 can divert at least a portion of the air from the flow path 740 to provide a reverse thrust. In various embodiments, the blocker doors 712 are configured to block up to 100% of the bypass flow path 740 and in other embodiments, the blocker doors 712 do not completely block the flow path 740. The blocker doors 712 can optionally be configured to expand relative to the longitudinal axis 790, for example, when a threshold pressure within the bypass flow path 740 has been reached.

FIGS. 8A-8D illustrate another embodiment of a nacelle 800. The nacelle 800 includes an inlet 802 defined by an inlet cowl 810 and an outlet 804 disposed aft of a splitter or outlet cowl 820. The inlet cowl 810 and outlet cowl 820 of the nacelle 800 can at least partially house or enclose an engine core 830 which extends along a centerline or longitudinal axis 890 of the nacelle 800. The engine core 830 is coupled to a fan 832 which rotates about the longitudinal axis 890 of the nacelle within the inlet cowl 810.

Figure 8A:
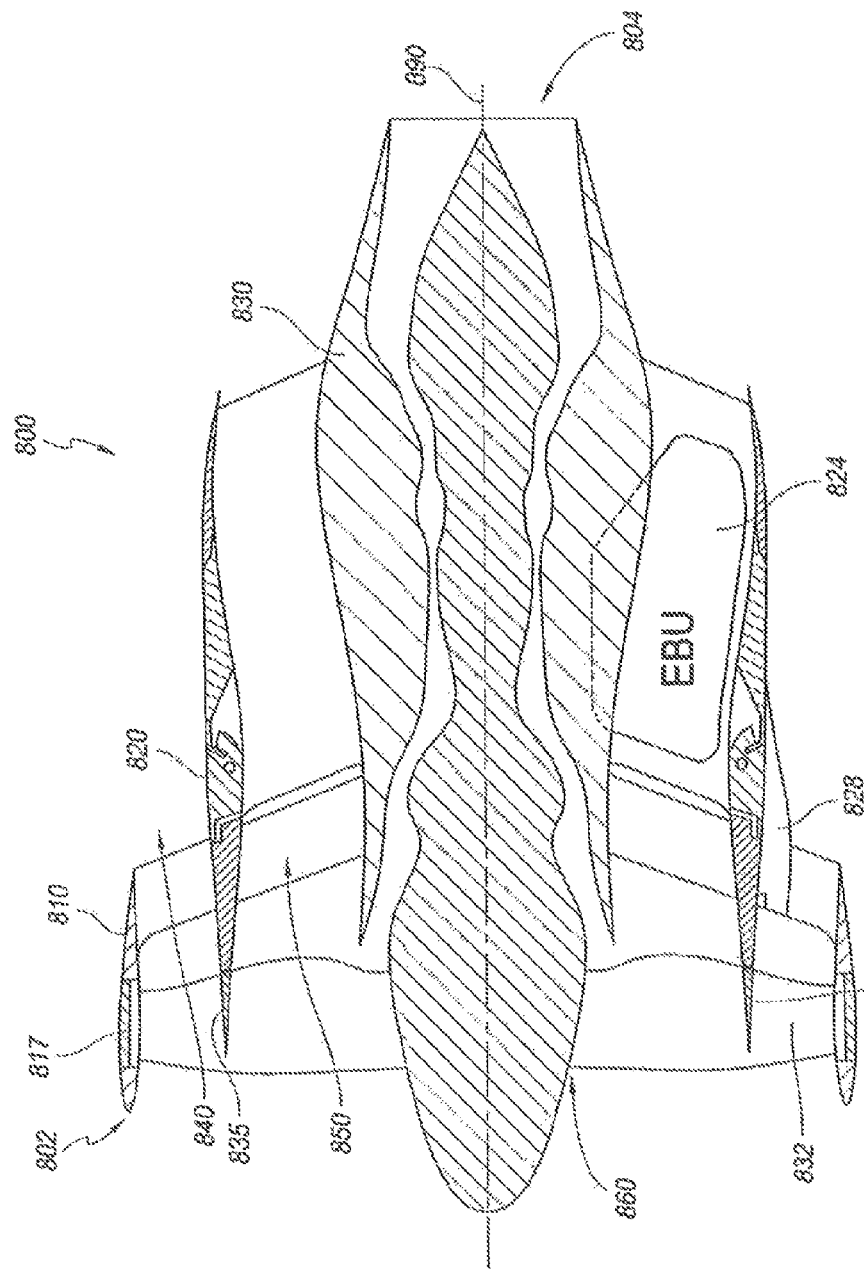
FIG. 8A is a cross-sectional view of a nacelle in a forward thrust configuration, in accordance with various embodiments.
Figure 8C:
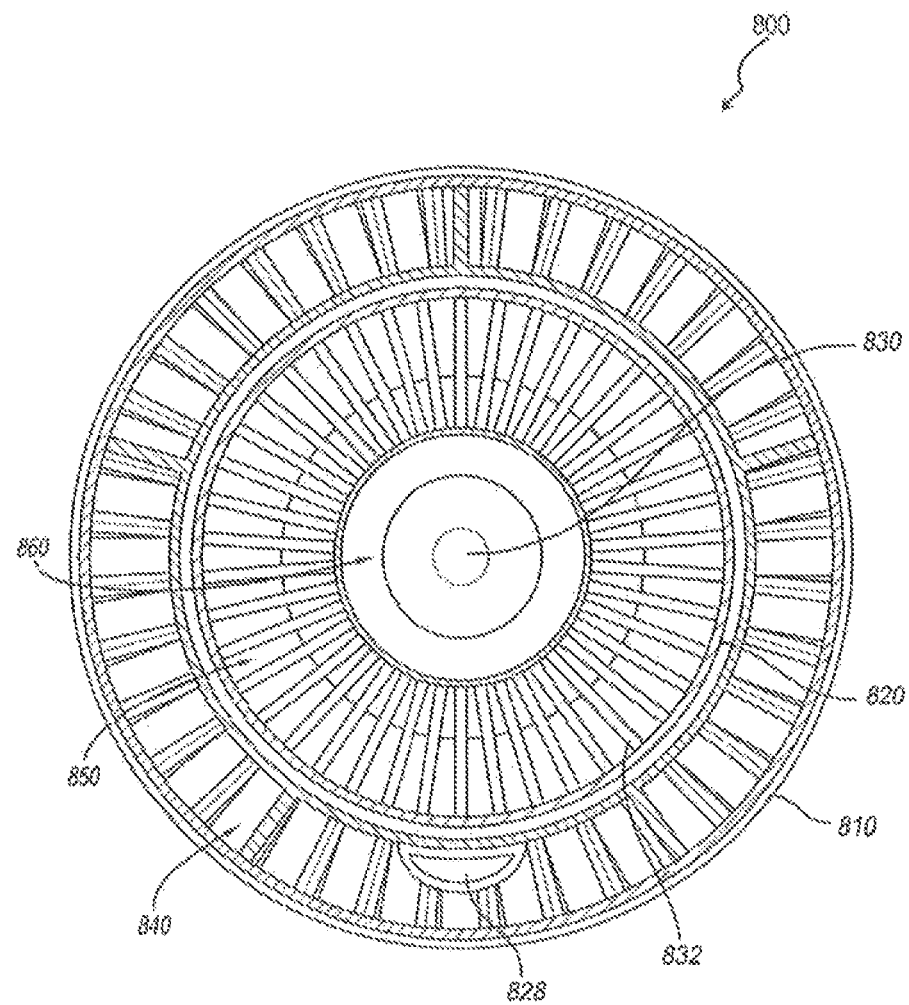
FIG. 8C is a front view of a nacelle, in accordance with various embodiments.
Figure 8D:
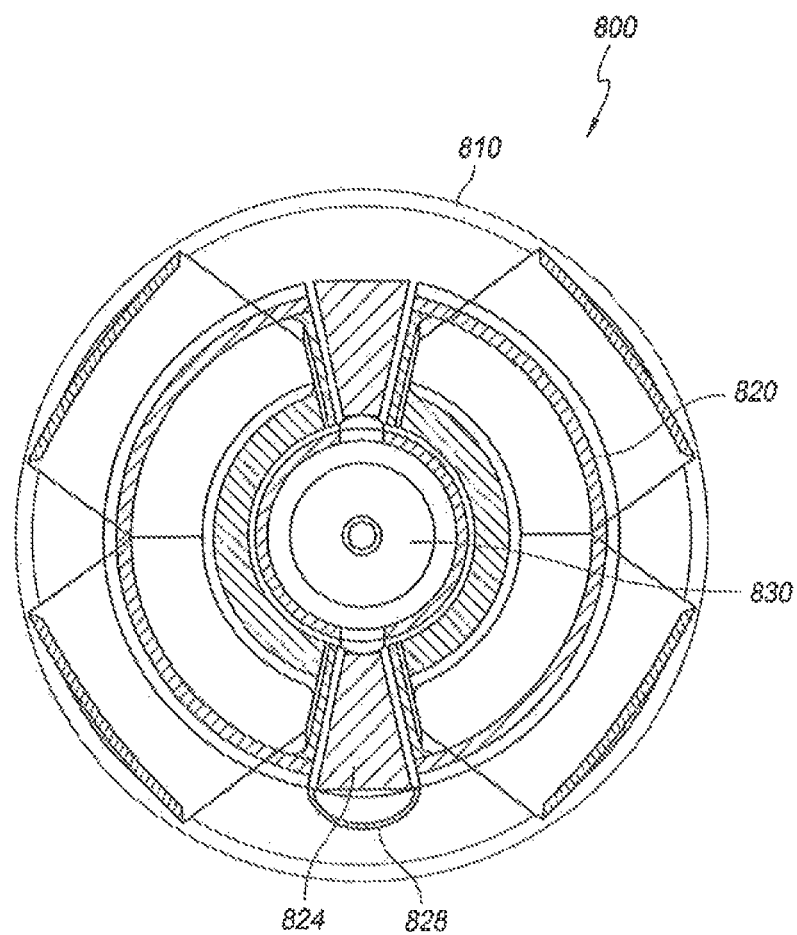
FIG. 8D is a schematic rear view of a nacelle, in accordance with various embodiments.

During flight the nacelle 800 and engine core 830 can provide a forward thrust to an associated aircraft (e.g., a force that thrusts the nacelle from right to left as illustrated in FIG. 8A). When the nacelle 800 is in a forward thrust configuration, air is drawn into the nacelle 800 through the inlet 802 by the fan 832. The drawn in air flows into the engine core 830 or passes over or bypasses the engine core 830. As shown in FIGS. 8A and 8B, in various embodiments, each blade of the fan 832 can include one or more pre-splitter features 835 to initiate a dynamic split or diversion of the bypass air that flows through the inlet 802 and over the engine core 830 into two or more bypass flow paths. Further, a leading edge of the splitter cowl 820 can be positioned aft but in close proximity to the fan 832 to divide the flow of bypass air. For example, in various embodiments the leading edge of the splitter cowl 820 is aft of the pre-splitter feature 835 so that the backpressure is vented before the flow entering the inlet 802 impacts the fan 832. In this way, the bypass air that flows through the inlet 802 and over (e.g., radially outward of) the engine core 830 is diverted, split, separated, or divided into a first flow path 840 and a second flow path 850 with the second flow path 850 being disposed between the first flow path 840 and the engine core 830 in the radial direction. As shown in FIGS. 8A and 8B, air that is drawn into the nacelle 800 through the inlet cowl 810 can flow through the first flow path 840, the second flow path 850, or a third flow path 860 through the engine core 830, and exit the nacelle 800 to provide a forward thrust.

As with the nacelle of FIGS. 2A-5, because the bypass air can be split between the first flow path 840 over the splitter cowl 820 and the second flow path 850 within the splitter cowl 820, the splitter cowl 820 can be significantly inset in the radial direction relative to the inlet cowl 810 while still providing sufficient bypass flow. As a result of the reduced diameter of the splitter cowl 820, the nacelle 800 can support an engine build up or "EMU" 824 more efficiently with shorter lines, lighter weights, and smaller/more access doors to distribute fluids, pneumatics and electrical lines or harnesses about the engine core 830. With less space required for EMI 824 components, elements may optionally be moved to a lower bifurcation zone. For example, an uphinged/fixed structure and direct access to this zone is enabled by hinging up smaller D-duct inner fixed structure ("IFS") reverser halves. The EBU 824 may be accessible by hinged D-duct halves of the splitter cowl 820. In various embodiments, these D-duct passages are symmetrically arranged to present balanced aero-loads to the fan 832 for improved service life. Additionally, because the splitter cowl 820 is at a reduced diameter and a bottom or six o'clock position of the splitter cowl 820 may be reserved for accessories, space is available to add a flow air scoop 828 for an oil cooler. For example, the air scoop 828 can be added between the closed splitter cowl 820 IFS D-ducts and the inlet cowl 810 maximum diameter. If additional space for the EBU 824 is required, this bottom or six o'clock zone can accommodate other components and/or be further deepened as a hanging tub for additional services.

Referring to FIGS. 8A and 8B, in various embodiments, the fan 832 can be disposed within a shroud 817 of the inlet cowl 810 to maximize fan diameter for performance while limiting aero-drag forces. That is to say, the shroud 817 can increase blade diameter and bypass ratio due to the fan size without increasing the drag profile of the fan 832. Of course, the shroud 817 is optional and in various embodiments, the fan 832 is not shrouded within the inlet cowl 810.

Turning now to FIG. 8B, the nacelle 800 is illustrated in a reverse thrust configuration. In various embodiments, the splitter cowl 820 of the nacelle 800 can include one or more blocker doors 822 disposed at the aft end of the splitter cowl 820. The blocker doors may rotate, articulate, or flex inward toward the longitudinal axis 890 of the nacelle 800 to block, impinge, occlude, or divert portions of the first bypass flow path 840 and/or second bypass flow path 850. In this way, bypass air flowing through the first or second flow paths 840, 850 can be at least partially diverted or blocked. In various embodiments, the blocker doors 822 can move or actuate to contact the outside of the engine core 830. In this regard, the second flow path 850 disposed between the engine core 830 and the splitter cowl 820 may be substantially blocked or diverted by the doors 822.

As shown in FIG. 8B, when the blocker doors 822 are actuated the bypass air that is blocked or diverted by the blocker doors 822 within the first or second flow paths 840, 850 can be diverted or redirected toward the inlet of the nacelle. By diverting or redirecting the flow of air that passes into the inlet 802 back towards the inlet 802, the blocker doors 822 can be configured to provide a reverse thrust to the nacelle 800 (e.g., a force that thrusts the nacelle from left to right as illustrated in FIG. 8B).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A nacelle comprising:
   a first cowl configured to at least partially enclose an engine core to define a bypass flow path for receiving a flow of bypass air;
   a fan configured to rotate within the first cowl; and
   a second cowl radially offset from the first cowl, the second cowl being configured to separate the bypass flow path into at least a first flow path and a second flow path, the first flow path being disposed radially outward of the second cowl and the second flow path being disposed between the first flow path and a volume configured to receive the engine core,
   wherein the second cowl comprises a blocker door configured to move between at least a first configuration and a second configuration, and
   the blocker door is configured to divert exhaust air from an engine core.

2. The nacelle of claim 1, wherein the fan comprises a pre-splitter feature configured to at least partially divide the flow of bypass air into the first flow path and the second flow path forward of the second cowl.

3. The nacelle of claim 1, wherein the second cowl is disposed at least partially within the first cowl.

4. The nacelle of claim 1, wherein the blocker door is configured to at least partially obstruct the flow of bypass air through the first cowl and the second cowl.

5. The nacelle of claim 1, wherein the blocker door is configured to divert the flow of bypass air through the second cowl to create reverse thrust.

6. The nacelle of claim 1, wherein the blocker door is rotatably coupled to the second cowl.

7. The nacelle of claim 1, wherein a diameter of the second cowl is at least 30 percent smaller than the diameter of the first cowl.

8. A flow splitter system, comprising:
   an outer cowl configured to at least partially enclose an aircraft engine core to define a bypass flow path;
   a splitter cowl at least partially enclosed by the outer cowl, the splitter cowl annularly spaced within the bypass flow path; and
   a fan disposed within the outer cowl and configured to conduct an airflow through a portion of the outer cowl and the splitter cowl, wherein the fan is driven by the aircraft engine core,
   wherein the splitter cowl is configured to split the bypass flow path into a first flow path disposed radially outward from the splitter cowl and a second flow path disposed radially inward from the splitter cowl,
   the splitter cowl comprises a blocker door,
   a fore-most portion of the blocker door is configured to obstruct the first flow path, and
   an aft-most portion of the blocker door is configured to obstruct the second flow path.

9. The flow splitter system of claim 8, wherein the aircraft engine core is enclosed by an inner fixed surface.

10. The flow splitter system of claim 9, wherein the inner fixed surface is at least partially enclosed by the splitter cowl to define a flow passage.

11. The flow splitter system of claim 10, wherein the inner fixed surface comprises a blocker door that is configured to divert an airflow through the flow passage to create a reverse thrust.

12. A thrust reverser system, comprising:
   a first cowl configured to define a first bypass flow passage;
   a second cowl disposed within the first cowl and configured to define a second bypass flow passage, the second cowl comprising a plurality of blocker doors, wherein a fan of an aircraft engine is configured to conduct air through the first bypass flow passage and the second bypass flow passage in response to the aircraft engine operating,
   wherein the first bypass flow passage is located radially outward from the second cowl,
   the second bypass flow passage is located radially inward from the second cowl,
   the plurality of blocker doors are deployable from the second cowl to divert air from the second bypass flow passage to create a reverse thrust, and
   a fore-most portion of each of the plurality of blocker doors extends at least partially into the first bypass flow passage in response to the plurality of blocker doors being deployed.

13. The thrust reverser system of claim 12, wherein the plurality of blocker doors are configured to obstruct at least a portion of the first bypass flow passage.

14. The thrust reverser system of claim 12, wherein the fan comprises a pre-splitter feature configured to at least partially divide the air between the first bypass flow passage and the second bypass flow passage.

15. The thrust reverser system of claim 12, wherein the plurality of blocker doors are disposed on an aft end of the second cowl.

* * * * *